United States Patent
Hildebrand et al.

(10) Patent No.: US 12,246,499 B2
(45) Date of Patent: Mar. 11, 2025

(54) PROCESS FOR WELDING PROFILES TO A BELT

(71) Applicant: Habasit AG, Reinach (CH)

(72) Inventors: Peter Hildebrand, Rodermark (DE); Tobias Fleckenstein, Eppertshausen (DE)

(73) Assignee: Habasit AG, Reinach (CH)

( * ) Notice: Subject to any disclaimer, the term of this patent is extended or adjusted under 35 U.S.C. 154(b) by 165 days.

(21) Appl. No.: 17/641,800

(22) PCT Filed: Sep. 8, 2020

(86) PCT No.: PCT/EP2020/074999
§ 371 (c)(1),
(2) Date: Mar. 9, 2022

(87) PCT Pub. No.: WO2021/048079
PCT Pub. Date: Mar. 18, 2021

(65) Prior Publication Data
US 2022/0379573 A1     Dec. 1, 2022

(30) Foreign Application Priority Data
Sep. 9, 2019   (EP) ..................... 19196118

(51) Int. Cl.
*B29D 29/06*     (2006.01)
*B65G 15/44*     (2006.01)

(52) U.S. Cl.
CPC ............. *B29D 29/06* (2013.01); *B65G 15/44* (2013.01)

(58) Field of Classification Search
CPC .... B29D 29/06; B65G 15/44; B29C 66/0342; B29C 66/73113; B29C 66/7352; B29C 66/919; B29C 65/18; B29C 65/224; B29C 65/30; B29C 66/0042; B29C 66/524; B29C 66/8122; B29C 66/81419; B29C 65/38; B29C 66/8324; B29C 66/73921; B29C 66/71; B29L 2031/7092; B29K 2021/003;
(Continued)

(56) References Cited

U.S. PATENT DOCUMENTS

| | | |
|---|---|---|
| 3,373,067 A | 3/1968 | Hagstrom |
| 4,104,094 A | 8/1978 | Peterson |

(Continued)

FOREIGN PATENT DOCUMENTS

| | | | |
|---|---|---|---|
| CN | 208977047 U | * | 6/2019 |
| EP | 1249638 A2 | | 10/2002 |

(Continued)

OTHER PUBLICATIONS

CN-208977047-U Machine Translation of Description (Year: 2024).*
(Continued)

*Primary Examiner* — Cynthia L Schaller
(74) *Attorney, Agent, or Firm* — Hodgson Russ LLP

(57) ABSTRACT

A process for welding profiles (1) of a thermoplastic or thermoplastic elastomer to a top layer (3) of a belt (2), such as a conveyor belt, also being made of a thermoplastic or thermoplastic elastomer. The process uses thermal impulse welding and applies the welding heat onto the surface (21) of the belt (2) which is opposite to the top layer (3). The process is in particular suited for welding TPO profiles to TPO top layers.

14 Claims, 2 Drawing Sheets

(58) Field of Classification Search
CPC ............ B29K 2101/12; B29K 2023/00; B29K 2075/00; B29K 2827/18
See application file for complete search history.

(56) References Cited

U.S. PATENT DOCUMENTS

| | | |
|---|---|---|
| 5,552,005 A | 9/1996 | Mammino |
| 6,602,156 B2 * | 8/2003 | Schlueter, Jr. .... B29C 66/30321 |
| | | 474/253 |
| 2003/0051810 A1 | 3/2003 | Mosher |

FOREIGN PATENT DOCUMENTS

| | | | | |
|---|---|---|---|---|
| EP | 1271263 A1 | 1/2003 | | |
| EP | 1318327 A2 | 11/2003 | | |
| FR | 2481642 A1 | 11/1981 | | |
| GB | 1538275 A * | 1/1979 | ............ | B29C 65/18 |
| JP | H1135122 A * | 2/1999 | | |
| WO | 98 38035 A1 | 9/1998 | | |

OTHER PUBLICATIONS

JP-H1135122-A Machine Translation of Description (Year: 2024).*
Setina, Janez; Erjavec, Bojan; Volume Determination of a Vacuum Vessel by Pressure Rise Method, XIX IMEKO World Congress Fundamental and Applied Metrology; Sep. 6-11, 2009; pp. 2096-2098; Lisbon, Portugal.

* cited by examiner

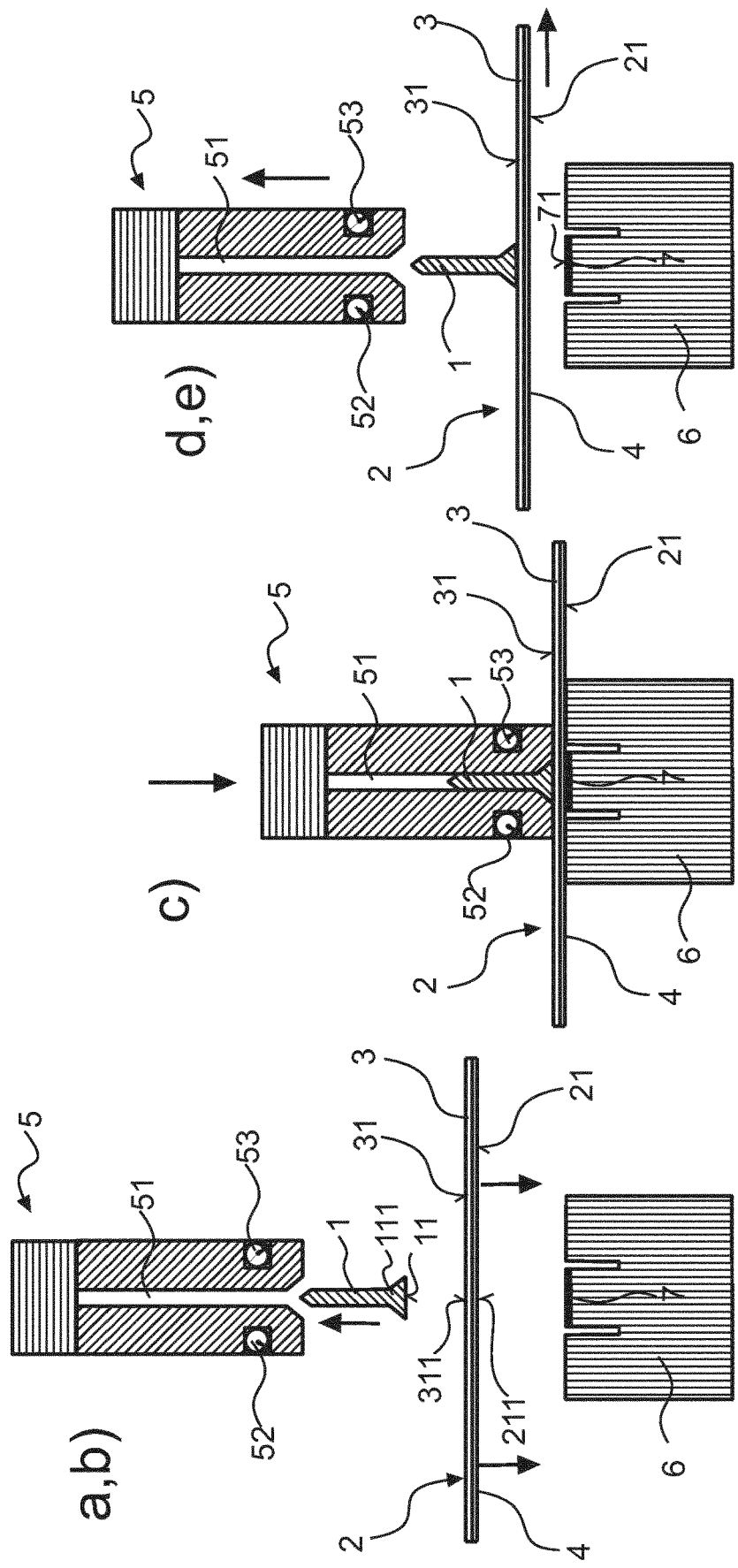

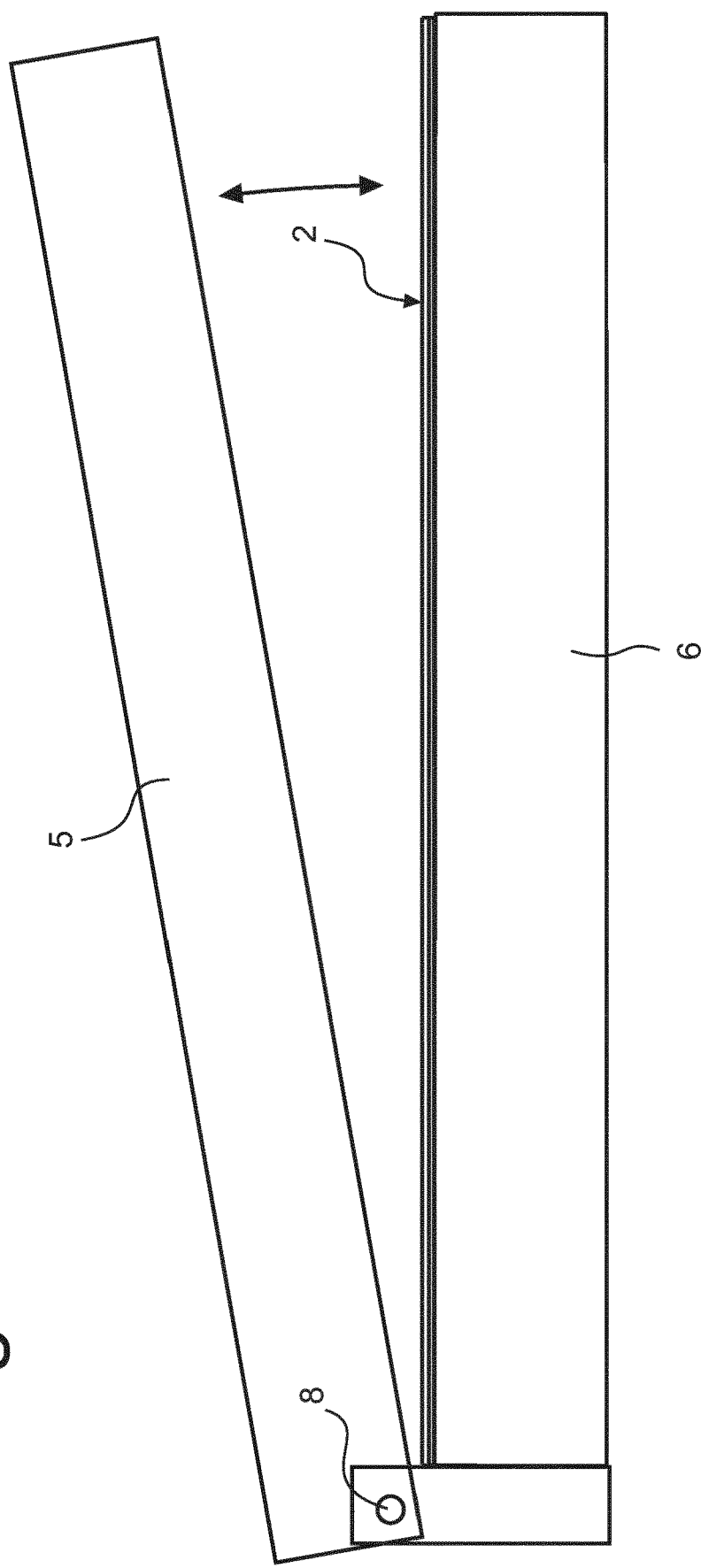

PROCESS FOR WELDING PROFILES TO A BELT

BACKGROUND

The present invention relates to a process for the manufacture of belts, in particular conveyor belts, having a profiled conveying surface and to a device for carrying out the process.

Continuous conveyor belts need for some applications a profiled conveying surface in order to impart a more tight guidance to the conveyed goods. Such applications are e.g. steep inclined conveyor belts wherein the conveyed good is to be transported between locations of strongly different height, and the normal adhesion of the conveyed good to an unprofiled conveying surface is no longer sufficient to prevent slipping of the conveyed good. Commonly known examples of such surface-profiled conveyor belts are chevron belts, fishbone belts and rufftop belts.

A surface profiling may also be advantageous on the pulley side of a conveyor belt, to prevent slipping of the conveyor belt over the driving pulley(s) in case of excessive torque applied by said driving pulley(s). Conveyor belts of this profiled type would normally be designated as toothed belts.

These surface profiles can normally not be applied simultaneously with the production of the belt itself by extrusion, lamination and/or calendaring; they must be adhered in a further, final manufacturing process, to the conveying surface of the conveyor belt. A customarily used method for welding profiles to a conveyor belt surface is high frequency welding (or radio frequency welding). In this method the welding heat is supplied directly to the plastic materials to be welded together by supplying electromagnetic HF energy (typically at 10-100 MHz) and pressure to the material surfaces to be joined. The HF energy causes the material to heat up by itself due to dielectric molecular vibrations induced therein. The dielectric heating causes the parts that are in intimate contact to melt, and the liquid polymers diffuse into each other at the interface. Diffusion and solidification of the joint occur while pressure is maintained for a specified time. This process produces very strongly bonded parts. HF welding can however only be used with materials of certain permittivity, otherwise the dielectric molecular vibrations induced by the HF energy and the associated heating up will be insufficient. Plastics particularly suited for high frequency welding are thus rather polar, such as PVC, PU, nylon, PET, EVA and some ABS plastics. Furthermore the associated technical equipment is expensive and difficult to handle.

A known technique for welding thin laminates, or foils of polyolefins together is thermal impulse welding, sometimes also called bar sealing. In this technique heat is intermittently created by an electrical current in a high electrical resistance conductor, such as a wire, typically made of nickel-chromium alloy. The intermittent current causes the conductor or wire to heat up rapidly, which heat is transferred to the materials to be welded together. Such composite polyolefin laminates were used e.g. for food packaging (see WO 98/38035 A1).

An end-joining method for a conveyor belt, using thermal impulse welding and a non-polyolefin strip as sealant, has also been known. Reference is made by way of example to EP 1 249 638 A2, US 2003/051810 A1, EP 1 271 263 A1 and EP 1 318 327 A2.

The invention seeks to provide a new method for welding profiles to the conveying surface or the pulley surface of a conveyor belt, which is particularly also suitable for belt surface material/profile material pairs in which both materials are of low permittivity, such as when both materials are a polyolefin, in particular a TPO.

SUMMARY OF THE INVENTION

The invention thus provides a process for welding a profile to a conveyor belt comprising a top layer with a top layer surface and an opposing surface opposite to the top layer surface, wherein the profile comprises or consists of a first thermoplastic or first thermoplastic elastomer, the top layer comprises or consists of a second thermoplastic or second thermoplastic elastomer, and the profile is welded to a first location on the top layer surface using heat and pressure, characterised in that
  i) the welding heat is applied by thermal impulse heating; and
  ii) the thermal impulse heating is applied to a second location on the opposing surface (21) which is opposite to the first location.

Preferred embodiments of the process are as in the dependent claims.

BRIEF DESCRIPTION OF THE FIGURES

FIG. 1 is a schematic representation of process steps of the process of the invention; and FIG. 2 is a schematic representation of the device of the invention, suited for carrying out the process of the invention.

DETAILED DESCRIPTION OF THE INVENTION

The inventive process applies the welding heat to the belt surface which is opposite to the surface onto which the profile shall be welded to, and which is accordingly herein termed "opposing surface". That is, for instance, if the profiles are to be welded to the conveying surface of a conveyor belt then the welding heat is applied to the belt's pulley side which eventually will contact belt supporting and transporting means, such as pulleys. The welding heat is thus carried from that opposing surface through the belt to the surface where the profile is welded to.

Therefore it is preferred for the inventive process that the overall belt thickness (that is, before applying the profiles) is at the most about 3 mm, more preferably at the most about 2.5 mm, to allow sufficient heat flow through the belt.

Furthermore in view of sufficient heat flow through the belt it is preferred that all isotropic materials incorporated into the belt (such as homogeneous thermoplastic layers) have a thermal conductivity of at least 0.1 $Wm^{-1}K^{-1}$ at any temperature in the range of 20° C. to 250° C. and/or that all anisotropic materials incorporated into the belt (such as fabrics) have said minimum thermal conductivity at least in that direction which, once the anisotropic material is included in the belt, is parallel to the belt thickness. Preferably this thermal conductivity is at least 0.2 $Wm^{-1}K^{-1}$ and more preferably at least 0.3 $Wm^{-1}K^{-1}$.

Still furthermore in view of sufficient heat flow through the belt it is preferred that any layers in the belt are essentially (that is, at the most 3 vol %, more preferably at the most 1 vol %, based on the volume of the layer in question) devoid of entrapped gas. More preferably any such layer is completely (that, is, at the most 0.5 vol %, based on the volume of the layer in question) devoid of entrapped gas.

This preferred feature entails that any fabric layers contained in the belt are preferably completely (that, is, at the most 0.5 vol %, based on the volume of the fabric layer in question, of residual entrapped gas) impregnated with a thermoplastic, thermoplastic elastomer or elastomer as exemplified above. This preferred feature still furthermore entails that any layers contained in the belt are preferably unfoamed.

For the purposes of the invention any gas contents G in volume percent, whether for an individual layer or for the overall belt, are measured and calculated according to the formula $$G = 100\% \times \frac{V_{GeoB} - V_R \left( \frac{1 - \dot{P}_3/\dot{P}_1}{1 - \dot{P}_2/\dot{P}_1} \right)}{V_{GeoB}}$$

wherein
- $V_{GeoB}$ is the geometric volume of a cuboid layer or belt sample to be tested; obtained on the cuboid layer or belt sample by geometric length and width measurement and geometric thickness measurement by thickness gauge under 0.2 bar overpressure as outlined above;
- $V_R$ is the volume of a reference sample with defined, known volume;
- $\dot{P}_1$ is the initial pressure rise over time ($dP_1/dt$ at t=0) measured in a fully evacuated vacuum chamber when it is flooded with Helium using a Helium permeation leak standard;
- $\dot{P}_2$ is the initial pressure rise over time ($dP_2/dt$ at t=0) measured in said vacuum chamber when said vacuum chamber, containing said reference sample and being fully evacuated, is flooded with Helium using said Helium permeation leak standard;
- $\dot{P}_3$ is the initial pressure rise over time ($dP_3/dt$ at t=0) measured in said vacuum chamber when said vacuum chamber, containing said cuboid layer or belt sample and being fully evacuated, is flooded with Helium using said Helium permeation leak standard; and
- $\dot{P}_1$, $\dot{P}_2$ and $\dot{P}_3$ are measured in said vacuum chamber at room temperature using a spinning rotor vacuum gauge.

The above volume percent determination over differential pressure rises as such is by itself known. See e.g. the publication "Volume Determination of a Vacuum Vessel by Pressure Rise Method", by Setina J. and Erjavec B., presented at the XIX$^{th}$ IMEKO World Congress "Fundamental and Applied Metrology" 6-11 September 2009 in Lisbon; and literature cited therein. Any of the mentioned "initial pressure rise over time" can also be taken from a non-infinitesimally small time period, that is as $\Delta P/\Delta t$ instead of as dP/dt, because the pressure rise initially is a straight line.

The first thermoplastic (or thermoplastic elastomer) and the second thermoplastic (or thermoplastic elastomer) form a pair of polymers to be welded together.

Preferably the two polymers of a material pair are both thermoplastics or are both thermoplastic elastomers. More preferably the two polymers of the pair are of the same polymer type, e.g. both are a TPO, both are PVC, or both are a TPU. Most preferably both polymers of the pair are a TPU or a TPO.

For the purposes of the invention the preferred TPU's are generally obtainable by reacting diisocyanate-containing hard block segments with polyester diol soft block segments in such amounts that the molar ratio of isocyanate groups to isocyanate reactive hydroxy groups "NNCO"/"NOH" present in the reaction mixture is between 0.9 and 1.1, preferably between 0.95 and 1.05, and most preferably between 0.99 and 1.01. In this quotient, NNCO is the number of isocyanate groups in the mixture, obtainable by amine titration and back-titrating excess amine with standard acid and expressed in mmol isocyanate groups per g of dry (or neat, solvent-free) weight of mixture, and NOH is the hydroxyl value of the compound mixture, expressed in mmol hydroxyl groups per g of dry (or neat, solvent-free) weight of mixture. The diisocyanate-containing hard blocks are obtainable by reacting a diisocyanate with a diol chain extender. The diisocyanate may be a pure compound or a mixture of diisocyanates. In one preferred embodiment the diisocyanate is an aromatic diisocyanate, more preferably one of the isomeric 2,2'-, 2,4' or, preferably, 4,4'-diphenylmethane diisocyanates. Suitable diol chain extenders include aliphatic $C_2$-$C_6$-diols, such as ethylene glycol, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol and 3-methylpentane-1,5-diol, or glycol ethers, such as diethylene glycol, dipropylene glycol and tripropylene glycol, and aminoalcohols such as ethanolamine, N-methyldiethanolamine and the like. The polyester diol soft segments used preferably have a molecular weight of between 500 and 20000. They may be prepared by reaction of a diol with a dicarboxylic acid, or, more conveniently, by reaction of a diol with the dimethyl ester of the dicarboxylic acid (transesterification) and boiling off the low-boiling methanol. Diols for the polyester diol are aliphatic linear or branched $C_2$-$C_8$ diols which optionally may contain a carbocyclic saturated $C_5$-$C_6$ ring. Examples therefor are ethylene glycol, propylene glycol, diethylene glycol, 1,4-butanediol, neopentyl glycol, 2-methylpropanediol, 3-methylpentane-1,5-diol, 1,6-hexanediol or cyclohexane dimethanol, and mixtures of such diols. The dicarboxylic acids for the polyester diol are aliphatic linear or branched $C_2$-$C_8$ dicarboxylic acids. Examples therefor are oxalic, malonic, succinic, glutaric and adipic acids or their dimethyl esters, sebacic acid, phthalic anhydride, tetrachlorophthalic anhydride or dimethyl terephthalate or mixtures thereof.

For the purposes of the invention the preferred TPO's may be either purely aliphatic, mixed aliphatic/aromatic or purely aromatic. Preferably they are purely aliphatic.

Most preferably the TPO's are purely aliphatic and are selected from:
- ethylene homopolymers, that is, polymers having less than 0.5%, preferably less than 0.1% by mol, of repetitive units other than —$CH_2$—$CH_2$—, based on the total of —$CH_2$—$CH_2$— repetitive units, whereby this content is determined by $^1$H-NMR;
- propylene homopolymers, that is, polymers having less than 0.5%, preferably less than 0.1% by mol, of repetitive units other than —$CH(CH_3)CH_2$—, based on the total of —$CH(CH_3)CH_2$— repetitive units, whereby this content is determined by $^1$H-NMR;
- ethene/propene copolymers;
- ethene/α-olefin copolymers, wherein the α-olefin may be selected from the group consisting of propene, 1-butene, 2-butene, 1-pentene, 1-hexene, 1-heptene and 1-octene;
- block copolymers comprising polyethylene and/or polypropylene hard segments and ethene/propene rubber or uncrosslinked ethene/propene/butadiene rubber soft segments; and blends of polyethylene and/or polypropylene and ethene/propene rubber and/or uncrosslinked ethene/propene/butadiene rubber.

All these TPU's and TPO's as such are conventional.

Minor amounts of thermosets of crosslinked or crosslinking materials may however be added to the first and/or second thermoplastic and/or the first and/or second thermoplastic elastomer, of a type and amount that does not impair their thermoplastic behaviour. Such additives may alter the mechanical properties of the thermoplastic or thermoplastic elastomer to which they are added, and would be added for this purpose in amounts customary in the art for the thermoplastic or thermoplastic elastomer and additive in question. A typical maximum amount of such additives may be 20% by weight, based on the thermoplastic or thermoplastic elastomer. It is however preferred that such additives are present in less than 2% by weight, based on the thermoplastic or thermoplastic elastomer. Most preferably the first and second thermoplastic and the first and second thermoplastic elastomer are devoid of thermosets and of crosslinking or crosslinked materials.

The two polymers of a pair preferably have a similar melting temperature or a similar lower boundary temperature of their melting intervals, wherein "similar" preferably means there is less than 10° C. difference between the two temperatures, more preferably less than 5° C. difference.

The two polymers of the pair are preferably also chemically compatible with each other. By "chemically compatible" is meant that the two polymers, when blended together, exhibit only one glass transition temperature in differential scanning calorimetry (DSC).

The first thermoplastic (or thermoplastic elastomer) and/or the second thermoplastic (or thermoplastic elastomer) may optionally contain additives, such as pigments, dyes, antimicrobials, antistatics, or plasticizers, provided that the properties and amounts of these additive(s) do not adversely affect the weldability of the first and/or second thermoplastic or thermoplastic elastomer.

The shape of the profiles to be welded to the belt is not limited, except that they must have a lower socket with a profile surface which is essentially, preferably fully planar and which which will contact the top layer surface. The term "essentially, preferably fully planar" allows for a certain roughness of the profile surface, provided that the clefts and asperities forming that roughness are levelled out when the material at the lower face melts during welding. Also any clefts at the profile surface should be of such shape that upon its melting any gas residing in these clefts is completely expelled out to the environment without leaving entrapped gas bubbles at the interface profile surface/top layer surface which might lower the adhesion between the two parts.

The socket preferably somewhat widens in cross-section near and towards the profile surface, such as to increase the latter somewhat. Such increased profile surface also improves the adhesion of the welded profile to the top layer surface. In one preferred embodiment the profiles have a cross-section which mostly is rectangular except for the socket which in cross-section widens in a form similar to, or identical to, a trapezoid, or more preferably, to an isosceles trapezoid. In this first preferred embodiment, the profile may also taper at a top portion thereof towards its apex, such that the cross-section of the top portion looks like a triangle or a triangle with a rounded top corner. In a second preferred embodiment the profiles have a cross-section which altogether is a trapezoid, in particular an isosceles trapezoid. In a third preferred embodiment the profiles have a cross-section in the shape of, or similar to, an "L" or an upside-down "T", wherein the lower horizontal dash therein represents the cross-section through the profile socket.

The profiles are preferably such that they retain a constant cross-section, as exemplified above, along essentially their entire length, that means, their entire length except for optional bends with essentially zero radius of curvature at the inner, concave side of the bend. The remainder of the length of the profiles, including any optional curved parts with non-zero radius of curvature over the entire length of their inner, concave side, may be considered having said constant cross-section.

The inventive process steps and device features will be further explained below.

The process of the invention is typically carried out as follows, also with reference to FIG. 1:

a) The belt 2 is laid onto a support 6 comprising a thermal impulse heating means 7, such hat the belt's top layer 3 is on top and the opposing surface 21 lies on the support 6;

b) a profile 1 to be welded to the top layer surface 31 is inserted into a holding and pressing tool 5;

c) The profile 1 to be welded to the top layer surface 31 is held by the holding and pressing tool 5 and pressed down thereby onto a first location 311 on the top layer surface 31, and the opposing surface 21 is heated at a second location 211 opposite to the first location 311 by the thermal impulse heating means 7, whereby the thermal impulse heating means 7 is heated to a temperature therein or near thereto and for a time sufficient such as to weld the profile 1 to the chosen first location 311;

d) the profile 1 welded to the first location 311 is released from the holding and pressing tool 5; and e) steps b) to d) are repeated for as many profiles that are to be welded to the top layer surface, wherein for each further profile to be welded a further first location on the top layer surface 31, different from the first location 311, is chosen and a corresponding further second location opposite to the further first location is chosen.

The profile 1 has a profile surface 11 which is preferably planar, but which in one embodiment may be curved, such as in the form of a cylinder. The size and shape of the profile surface 11 defines, and is identical to, the size and shape of the first location 311, and the profile 1 will be welded to the top layer surface 31 over the profile surface 11. As shown in the figure on cross-sectional view the socket 111 widens towards the bottom such as to allow for an enlarged profile surface 11, to enhance adhesion of the profile 1 to the top layer surface 31 after welding.

The support 6 is rigid enough such as to support the belt 2 and to withstand the pressure exerted onto it by the holding and pressing tool 5. For this the support 6 has a supporting surface 61 onto which the belt 2 is laid. The supporting surface 61 may in one embodiment be planar as shown in the figure. In another embodiment it may have a slight curvature, such as a section of a cylinder. A part of the support 6 is configured as a thermal impulse heating element 7, e.g. in the form of a bar, strip, flat wire or ribbon embedded in the support 6, which provides the welding heat. This thermal impulse heating element 7 is made of one of the known high electrical resistance materials mentioned in the introduction. Such thermal impulse heating elements 7 are even commercially available and are marketed e.g. as replacement parts for kitchen thermal impulse sealers used in the sealing of food containers by plastic foils. The thermal impulse heating element 7 has an upper surface 71 which may be either exposed to the environment or covered with a teflon strip, in which case that teflon strip is exposed to the environment. Either the exposed upper surface 71 itself or the surface of the teflon strip, if present, is flush with the supporting surface 61 and comes into direct contact with the opposing surface 21. The mentioned teflon cover of the upper surface 71 lowers the risk that the thermal impulse heating element 7 sticks to the lower surface 21 when hot.

The size and shape of the optionally teflon-covered upper surface 71 defines, and is identical to, the size and shape of the second location 211. Therefore, in order to ensure a complete welding of the profile surface 11 to the top layer surface 31, the size and shape of the optionally teflon-covered upper surface 71 should at least match the size and shape of the of the profile surface 11. Preferably the optionally teflon-covered upper surface 71 should have a larger size that the profile surface 11.

By "matching size and shape" is meant that it is possible to place the profile 1 with its profile surface 11 directly onto the optionally teflon-covered upper surface 71 such that any straight line running from the geometric centre of the profile surface 11 to its perimeter has an intersection with the perimeter of the profile surface 11 and also an intersection with the perimeter of the optionally teflon-covered upper surface 71, and the latter intersection is at equal distance from the geometric centre of the profile surface 11 as the former intersection, when measured along that straight line. The "geometric centre" is meant and calculated as the commonly understood "centroid" of the profile surface 11. More preferably the optionally teflon-covered upper surface 71 is larger that the profile surface 11.

By "larger size" is meant that it is possible to place the profile 1 with its profile surface 11 in at least one position and orientation directly onto the optionally teflon-covered upper surface 71 such that any straight line running from said geometric centre of the profile surface 11 to its perimeter has an intersection with the perimeter of the profile surface 11 and also an intersection with the perimeter of the optionally teflon-covered upper surface 71, and the latter intersection is farther away from said geometric centre of the profile surface 11 than the former intersection, when measured along that straight line.

In order for the second location 211 to be "opposite" to the first location 311 the second location 211 is chosen first. This is typically done by laying the belt 2 onto the support 6 as per above exemplary step a). Once the belt lies on the support 6, the portion of the opposing surface 21 that comes into direct contact with the optionally teflon-covered upper surface 71 will automatically be the second location 211 that is heated. Then, the profile 1, inserted into and held by the holding and pressing tool 5, is lowered onto and brought into contact with the top layer surface 31 in such a way that the profile surface 11 touches the top layer surface 31. This is as per above exemplary steps b) and c). When seen in an X-ray view in a direction opposite to said lowering direction, the profile surface 11 shall be completely eclipsed by the optionally teflon-covered upper surface 71. The contact area of the profile surface 11 with the top layer surface 31 is then a first location 311 opposite to the second location 211. Consequently, that second location 211 is automatically also opposite to that first location 311.

The pressure by which the profile 1 is pressed during the welding onto the top layer surface 31 as per above exemplary step c) and c) of FIG. 1 is not critical. It should on the one hand be sufficient to allow am intimate welding of profile surface 11 to the top layer surface 31. On the other hand it should be low enough such as to not significantly deform the profile 1, in particular the molten parts thereof.

A typical range for the applied overpressure (that is above ambient pressure) may be from 1 to 5 bars.

The extent and duration of heating by the thermal impulse heating element 7 as per above exemplary step c) and c) of FIG. 1 cannot be indicated in advance by a general teaching. However, the current which flows through the thermal impulse heating element 7 may be chosen in advance for a given belt 2 resting on it at the above chosen overpressure, such that the heat does not alter or degrade appreciably the second location 211 on the opposing surface 21, irrespective of the duration of the current pulse, wherein such duration may e.g. be up to 100 seconds. This is a first one-parameter optimization well within the capabilities of the skilled person, which yields the maximum permitted current to be used in the subsequent profile weldings. Then, for a given belt, profile to be welded to the belt, applied overpressure and with given said maximum permitted current, there is only the duration of the current pulse that remains to be optimized. This is a second one-parameter optimization well within the capabilities of the skilled person. Typical current pulse times used by the applicant are in the range of 5 to 30 seconds.

The holding and pressing tool 5 is either in the form of a gripper with two movable jaws which is the preferred form for profiles 1 with arbitrary cross-section. The two jaws allow to grab the profile by closing the jaws as per above exemplary step b), to hold it during welding as per above step c) and to subsequently release the welded profile by opening the jaws as per above exemplary step d). Alternatively and preferably the holding and pressing tool 5 is in the form of a one part or integral block with a slit 51 shaped into it. The orientation and opening of the slit is towards the support 6. This embodiment is particularly advantageous in the case of profiles with an cross-section having essentially straight lateral edges, such as in the above mentioned three preferred embodiments of the profiles. Here the profile snugly fits at least with its upper part above the socket, preferably entirely, into the said slit. The profile 1 to be welded is then simply slided with its upper part into to the slit 51 of the holding and pressing tool 5 before welding as per above step b) and b) of FIG. 1; during welding the profile 1 is retained in the slit as per above step c) and c) of FIG. 1, and after welding the profile is released from the holding and pressing tool simply by withdrawing the holding and pressing tool from the belt as per above step d) and d) of FIG. 1, so that the welded profile 1 slides out of the slit 51.

The holding and pressing tool 5 may optionally and preferably be pivotally connected to the support 6 such as to enable easy and precise forward and backward motion of the holding and pressing tool 5 with respect to the support 6. This embodiment is especially advantageous for the above discussed preferred embodiments of the profile where the pressing and holding tool is simply in the form of a block with a slit formed therein into which slit the profile is slided in and out. It is also particularly advantageous for straight profiles.

According to the invention it is not necessary that the holding and pressing tool 5 itself is heated, and accordingly it is not necessary that the holding and pressing tool 5 comprises heating means. In a preferred embodiment the holding and pressing tool 5 however does comprise such heating means, which may be of any type, such as electrical constant or impulse heating, induction, infrared radiation or hot air. Heating means in the form of an electrical constant heating are exemplified in FIG. 1 by reference numerals 52,53. These heating means comprised in the holding and pressing tool 5 are by themselves neither designed nor intended to weld the profile 1 to the top layer surface 31. Their purpose is to pre-heat the profile 1 to be welded such as to lower the temperature gradient between profile surface 11 and the remainder of the profile 1 remote to the profile surface 11, which might prevent build-up of internal tensions in the profile 1 during welding and an associated distortion thereof after the welding.

A typical pre-heating temperature to be achieved in the profile by said heating means of the holding and pressing tool might be in the range of 60° C. to 100° C., preferably 70° C. to 90° C., whereby the softening behaviour of the first thermoplastic or first thermoplastic elastomer at elevated temperatures may be considered; the pre-heating temperature should chosen such as to be well below the melting temperature or well below the lower boundary value of the melting range of the first thermoplastic or first thermoplastic elastomer in question. "Well below" may mean here "50° C. to 100° C. lower".

The pre-heating of the profile 1 by said optional heating means in the holding and pressing tool 5 may be during any of abovementioned steps b) and/or c). In addition thereto or instead it may also be after step c) and before step d), to allow a delayed or slower cooling down of the welded profile 1 which again might be beneficial in view of avoiding build-up of internal tensions in the profile 1 and might improve the quality of the weld between profile surface 11 and first location 311 after complete cooling down.

The steps of inserting a further profile 1 into the slit 51 of the holding and pressing tool 5 or grabbing a further profile 1 with the jaws of the holding and pressing tool 5;

lowering the profile 1 onto the top layer surface 31 and welding its profile surface 11 to a further first location of the top layer surface 31; and releasing the welded profile from the holding and pressing tool 5; as per above exemplary step e) and e) of FIG. 1, may be repeated for as many times as there are profiles to be welded to the top layer surface 31. A typical way of proceeding here would be that, after a profile 1 has been welded to the top layer surface 31, the belt is shifted in longitudinal direction by a given displacement and then re-applied to the support 6 as per above exemplary step a).

The process of the invention allows to reliably weld profiles, in particular of a TPO, to the surface of a top layer of a belt, wherein the top layer is again preferably of a TPO. The belt so profiled may e.g. be a conveyor belt or a chevron belt, fishbone belt or rufftop belt; preferably it is a conveyor belt. In this preferred case the profile(s) is(are) preferably welded to the intended conveying surface which then will be simultaneously the top layer surface 1. It is in fact customary that conveyor belts have by themselves a surface modifying layer, which, if made from one of the materials suitable for the welding process of the invention, will then simultaneously be the top layer 3. Similarly in this preferred application, the heating will be applied onto the conveyor belts intended pulley-contacting surface, which in many cases simply is a fabric or an impregnated fabric.

The profiles welded to a belt's top layer surface 31 using the inventive process exhibit excellent adhesion to the belt and cannot be peeled off the belt under normal use conditions thereof.

A device for welding profiles 1 to a top layer surface 31 of a conveyor belt 2 using thermal impulse heating is also part of the invention. This device comprises a support 6 including a thermal impulse heating means 7 and a holding and pressing means 5 with a slit 51 formed therein for holding and pressing the profile 1 down onto the belt 2 during the welding. As in the process, the device also preferably has a holding and pressing means 5 pivotally mounted onto the support 6. This pivotal mounting of holding and pressing means 5 onto the support 6 is schematically shown in FIG. 2. This figure shows the device in a form where the holding and pressing means 5 is rotated upwards by an angle of about 10° arount the pivot 8 to facilitate insertion of the profile to be welded into the slit 51 (these are not shown in this figure). The belt 2 is shown in its transverse direction; the belt's travel direction would typically be perpendicular to the paper plane of the figure.

The invention will now be exemplified by the following non-limiting examples.

EXAMPLES

Example 1: Welding of Profiles onto Different Belt Types

A custom built thermal impulse heater similar as the one depicted in FIG. 1 was used. This heater consisted of a support 6 with a teflon-covered thermal impulse heating means 7 in the form of a strip. The supporting surface 61 of the support and the teflon-covered upper surface 71 of the thermal impulse heating means 7 together formed a plan surface onto which the belt to be processed was supported. The profiles 1 to be welded to the belts had a cross section similar as the one depicted in FIG. 1, with a profile socket 111 and a profile surface 11 that was enlarged thereby. The profile surface 11 was also plan. Apart from the socket 111 the profiles 1 had an essentially rectangular cross-sectional shape, except for a top portion that tapered towards its apex. The profiles 1 consisted of the same thermoplastic or the same thermoplastic elastomer as the thermoplastic or thermoplastic elastomer present in the top layer 3 of the belt 2 to be processed (see table below). The profiles were straight, with a length of about 50 cm, and had a constant cross-section over that entire length. In view of the cross-section of the profiles 1, the holding and pressing means 5 consisted of a one part or integral block with a slit shaped into it. The profiles fitted entirely and snugly into this slit. The holding and pressing means 5 comprised heating means in the form of an electrical constant heating 52,53. These heating means were used to hold the holding and pressing means 5 at a constant temperature of about 80° C. during the welding time and the subsequent cooling time (see the table below). The support 6 and the holding and pressing means 5 were connected over a pivot such as to allow a pivotal rotation of the holding and pressing means 5 with respect to the fixed support, to allow easy forward and backward movement of the former with respect to the latter.

Several commercial conveyor belt types of the applicant were used as the starting belts. These were as follows:

| Belt type | top layer | other layers | overall belt thickness (mm) | heating/ welding time (s) | temperature at thermal impulse heating means 7 (PT 100 thermosensor) | Cooling time (s) |
|---|---|---|---|---|---|---|
| EMB-12EMCH | TPU | 2 impregnated fabric traction layers | 1.7 | 25 | 190 | 20 |
| FAB-8E | TPU | 2 impregnated fabric traction layers | 1.6 | 25 | 200 | 25 |
| E-12EMBT | TPU | 2 impregnated fabric traction layers | 1.7 | 20 | 210 | 20 |
| HNB-12E | TPU | 2 impregnated fabric traction layers | 2.4 | 20 | 220 | 20 |
| H-5EFGT | TPU | 2 impregnated fabric traction layers | 1.2 | 20 | 200 | 20 |
| H-8EXDT | TPU | 2 impregnated fabric traction layers | 1.4 | 20 | 200 | 20 |
| FAB-12E | TPU | 2 impregnated fabric traction layers | 2.4 | 30 | 210 | 25 |
| TT-12 | TPU | 2 impregnated fabric traction layers | 1.3 | 25 | 210 | 20 |

It was observed that in some cases in the inventive welding process a slight bulge is formed on the opposing surface at the second location. This bulge, if present, was found not to be detrimental to the function of the belt. The formation of this bulge could be lowered, or even prevented, by reducing the heating temperature and/or welding time without affecting the adhesion of the profiles to the top layer.

Example 2: Welding of a TPO Profile 1 onto a Belt with a TPO Top Layer 3

The TPO profile 1 had a similar cross-section as the profiles used in the preceding example. The width at the profile socket 111 was 10 mm (giving thus a contact area width of profile socket 111 and top layer surface 31 of 10 mm) and the length of the profiles was about 3 m. The welding setup was as described in example 1. The belt specimen with the profile 1 welded to its top layer surface 31 was subject to a peel strength testing in order to determine the bonding strength of the profile socket to belt surface. A Zwick/Roell tabletop testing machine Z020 was used. The testing temperature was 23° C.

During the test the welded profile was peeled off from the belt surface over a test length of 200 mm at a testing speed of 100 mm/min. Once the profile started to peel off from the belt surface, the peel strength required to further peel off the profile from the belt surface was recorded as a function of the travelled test length. Over this entire travelled and recorded test length, which was about 170 mm, the recorded graph indicated peel strengths between 78 N/cm and 93 N/cm. This is about three times the peel strength that is typically observed between individual layers of the belt itself, such as between a TPO cover layer and a fabric traction layer. The welding process of the invention thus leads to an excellent bonding between profile and belt surface.

The invention claimed is:

1. A process for welding a profile (1) to a belt (2) comprising a top layer (3) with a top layer surface (31) and an opposing surface (21) opposite to the top layer surface (31), wherein the profile (1) comprises a first thermoplastic or first thermoplastic elastomer, the top layer (3) comprises a second thermoplastic or second thermoplastic elastomer, and the profile (1) is welded to a first location (311) on the top layer surface (31) using heat and pressure, characterised in that i) the welding heat is applied by thermal impulse heating; and ii) the thermal impulse heating is applied to a second location (211) on the opposing surface (21) which is opposite to the first location (311).

2. The process of claim 1, wherein: the profile (1) comprises a first thermoplastic elastomer; and the top layer (3) comprises a second thermoplastic elastomer; or the profile (1) comprises a first thermoplastic; and the top layer (3) comprises a second thermoplastic.

3. The process of claim 2, wherein the first thermoplastic elastomer is identical to the second thermoplastic elastomer, or the first thermoplastic is identical to the second thermoplastic.

4. The process of any one of claims 1 to 3, which does not use a hotmelt adhesive or crosslinking adhesive during welding.

5. The process of any one of claims 1 to 3, wherein the belt (2) consists of the top layer (3).

6. The process of any one of claims 1 to 3, wherein the belt (2) comprises the top layer (3) and a traction layer (4) comprising a fabric which is impregnated with a third thermoplastic or third thermoplastic elastomer.

7. The process of any one of claims 1 to 3, wherein during welding the pressure is exerted onto the profile (1) by means of two gripper jaws (51,52) which either do not comprise heating means and are not heated, or comprise heating means and are optionally heated therewith.

8. The process of any one of claims 1 to 3, wherein the profile (1) consists of the first thermoplastic or first thermoplastic elastomer and/or the top layer (3) consists of the second thermoplastic or second thermoplastic elastomer.

9. The process of any one of claims 1 to 3, wherein the belt (2) is a conveyor belt.

10. The process of claim 9, wherein the top layer surface (31) is the conveying surface of the conveyor belt and the opposing surface (21) is the pulley facing surface of the conveyor belt.

11. The process of claim 2, wherein the first thermoplastic elastomer is a TPU and/or the second thermoplastic elastomer is a TPU.

12. The process of claim 2, wherein the first thermoplastic is a TPO and/or the second thermoplastic is a TPO.

13. A device for carrying out the process of claim 1, comprising 1) a support (6) with a supporting surface (61) for supporting the belt (2) and including a thermal impulse heating means (7) with an upper surface (71); 2) a holding and pressing means (5) with a recess or slit (51) formed therein for holding the profile (1); wherein the holding and pressing means (5) is movable towards the support (6).

14. The device of claim 13, wherein the holding and pressing means (5) is pivotally (8) mounted to the support (6).

* * * * *